US008692395B2

(12) United States Patent
Yeh

(10) Patent No.: US 8,692,395 B2
(45) Date of Patent: Apr. 8, 2014

(54) GRAVITY POWER GENERATING APPARATUS

(75) Inventor: Hung-Hsien Yeh, Zhongli (TW)

(73) Assignee: Kun Yi Enterprise Co., Ltd (TW)

( * ) Notice: Subject to any disclaimer, the term of this patent is extended or adjusted under 35 U.S.C. 154(b) by 716 days.

(21) Appl. No.: 12/962,363

(22) Filed: Dec. 7, 2010

(65) Prior Publication Data

US 2012/0013131 A1 Jan. 19, 2012

(30) Foreign Application Priority Data

Jul. 16, 2010 (TW) .............................. 99123470 A

(51) Int. Cl.
    *F02B 63/04* (2006.01)
(52) U.S. Cl.
    USPC ......................................................... 290/1 R
(58) Field of Classification Search
    USPC .................... 290/42, 53, 54, 1 R; 416/7, 8, 11
    See application file for complete search history.

(56) References Cited

U.S. PATENT DOCUMENTS

| 528,015 | A | * | 10/1894 | MoMurrin | 416/7 |
| 4,718,232 | A | * | 1/1988 | Willmouth | 60/495 |
| 2009/0309373 | A1 | * | 12/2009 | O'Briant | 290/1 R |
| 2010/0096860 | A1 | * | 4/2010 | Regis | 290/1 R |
| 2010/0096861 | A1 | * | 4/2010 | Bak | 290/1 R |
| 2010/0127509 | A1 | * | 5/2010 | McCarthy | 290/1 R |

* cited by examiner

*Primary Examiner* — Julio Gonzalez
(74) *Attorney, Agent, or Firm* — Shimokaji & Associates P.C.

(57) ABSTRACT

The present invention provides a gravity power generating apparatus comprising a set of a plurality of magnetic heavy objects; a generator for generating electrical power by rotating a rotor of the generator, wherein the rotation of the generator is accomplished by having each heavy object to pass through a gravity route; a delivery route for delivering each heavy object to drive each heavy object to pass through the gravity route; a delivery route motor for supplying power for the delivery route; and a plurality of magnetic elements provided around the gravity route, wherein each magnetic element is wound around with a coil on the surface so that an electrical current is generated in the coil to supply to the delivery route motor.

14 Claims, 6 Drawing Sheets

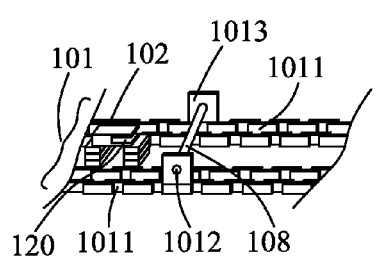
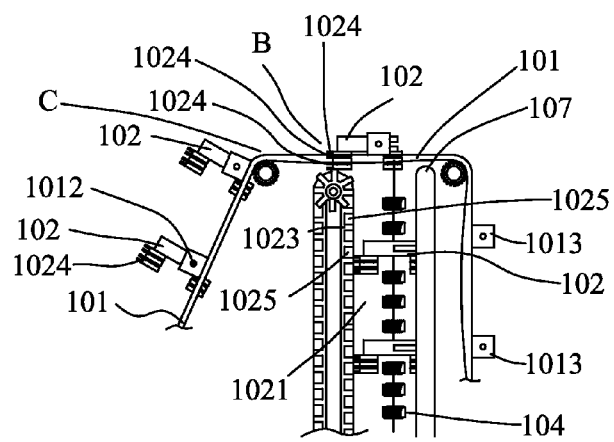
FIG. 4(a)    FIG. 4(b)
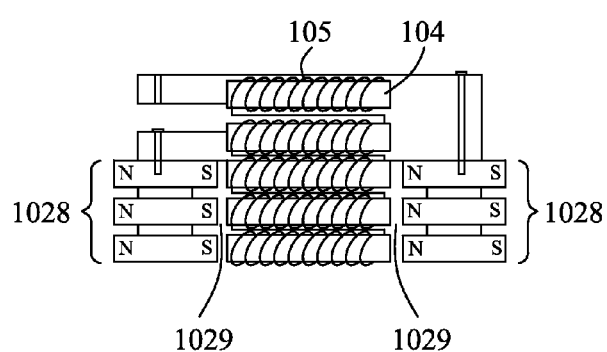
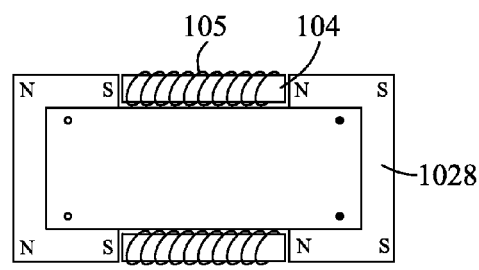
FIG. 4(c)    FIG. 4(d)

GRAVITY POWER GENERATING APPARATUS

TECHNICAL FIELD

The present invention generally relates to a gravity power generating apparatus.

BACKGROUND

Electrical power has been becoming an essential source for human beings in daily life. The electrical power is indispensible to the development of all kinds of industry.

The basic principle of electrical generators is set by placing a wound conductive wire as a induction coil in a magnetic field formed by electromagnets or permanent magnets. The induction coil is rotated within the magnetic field around a rotating axis. The area surrounded by the induction coil thus cuts the magnetic field to generate induced electromotive force. Then an induced current is therefore produced in the wound conductive wire of the induction coil.

Compared to the above-mentioned electrical generators, the generator used in a power generating plant is different due to the induced current desired by the power plant is very huge. Referring to FIG. 6, it is a configuration graph of a conventional generator used in a power generating plant. Permanent magnets or electromagnets 6011 are provided on the rotor 601 rotating around a rotating axis. A circular magnetic core 602, which is wound by conductive wire, used as a stator, is used to cover the surrounding of the rotor 601. An induced current is produced in the wound conductive wire of the stator 602 when the rotor 601 is rotated around the rotating axis. In practice, various power of energy sources are used to rotate the rotor to generate electrical power through the generator, such as wind power, hydraulic power, thermal power, etc.

However, the power generating manners using the above energy sources have to meet several problems as below. (1) The energy sources may be exhausted in a predictable future and the cost is comparatively expensive. (2) The environment control is complicate, and if the pollution happens it is permanent to the environment for some power of energy sources, such as nuclear power. (3) The energy sources, such as hydraulic power generation and wind power generation, should depend on special natural environments such as wind season, and therefore it becomes difficult to control the amount of the power that is able to generate.

For example, thermal power generation consumes a lot of petroleum or coal as fuel. Not only is the fuel expensive, but also it is annoying about how to transport the fuel and how to deal with the fume wasted from combustion. Further, the petroleum and coal may be depleted due to over exploitation. On the other hand, the energy source of hydraulic power is from the amount of water flowing from high position to low position. However, the amount of water can not be controlled by human beings. For example, in general, the amount of water is less in winter due to dry season while the amount of water in summer is more sufficient due to raining. Thus, the hydraulic power generating method can not guarantee the efficiency when in high peak electric consumption period. Nevertheless, nuclear irradiation is with disadvantage from the public fear for its danger, even if we have not considered that the amount of uranium also becomes rare in the world. Whilst, wind power generation will also meet difficulty when used in areas or seasons blowing wind too strong or too weak. Moreover, the wind power generator is not usable if the wind velocity exceeds the allowable range in order to prevent the blades of the generator from being destroyed.

Based on the reason of environment protection and eternal development, there are still some new but not yet widely popular power sources for generating electrical power, such as solar power, tidal power, ocean thermal power, geothermal power, biomass power, etc. Although the pollution is much less and the energy sources are more sufficient in some areas, the energy sources are naturally limited by special geographic areas or environment conditions. The above power generating manners may not be used widely and the amount of generated power is difficult to be controlled precisely so that the generated power may not reach the desired amount. Accordingly, these are not ideal for the industrial needs as stable energy source power. Moreover, the cost of these special power generating plants is more expensive than general power plants.

Thus it becomes an issue to provide a generating manner with more stable energy source, less pollution to the environment, more economical benefit, and more suitable for being adapted in any geographic areas and any environment conditions than the conventional power sources. It is beneficial to provide a gravity power generating apparatus, wherein heavy objects fall to rotate generators, and an electrical current is induced by electromagnetic effect to serve as energy for delivering the heavy objects from a falling place to a high place. The above gravity power generating apparatus is advantageous in cost-down, easy-maintenance, and capability in adjusting the amount of generated power by adjusting the weight of each heavy object. In addition, it doesn't pollute the environment at all and is adapted to any geographic areas. It is also advantageous in that it applies to the area lacking natural resource such as wind, water, solar light for generating electrical power.

SUMMARY

In one aspect of the present invention, a gravity power generating apparatus is provided, comprising: a plurality of heavy objects as a set of heavy objects, each heavy object being with magnetism; a generator for generating electrical power by rotating a rotor of the generator, wherein the rotation of the generator is accomplished by having each heavy object of the set of heavy objects to pass through a gravity route by gravity; a delivery route chain for delivering each heavy object from a lowest level spot to a highest level spot to drive each heavy object to move through the gravity route by gravity; a delivery route motor for supplying power for the delivery route chain, wherein the delivery route motor is initially started by an external power source; and a plurality of magnetic elements provided around the gravity route, wherein each magnetic element is wound around with a coil on the surface so that the magnetic flux of each magnetic element is changed when each heavy object passes through the gravity route to induce an electrical current in the coil as power of electromagnetism to supply to the delivery route motor, wherein the gravity route is provided with a gravity transmission chain being engaging with each heavy object to move downward so as to pull the gravity transmission chain downward to rotate the, rotor of the generator, wherein delivery route motor maintains the operation of the delivery route chain by receiving the power from the external power source, the magnetic elements or the generator, and wherein the power of the delivery route chain required from the external power source is alleviated by the power supplied from the magnetic elements and/or the generator.

In another aspect of the present invention, the generator is provided with multiple sets of driving gears to be driven by the multiple gravity transmission chains.

In another aspect of the present invention, the plurality of magnetic elements are provided on both sides of the gravity route, a surface on each magnetic element is wound with a coil as a winding coil, each winding coils on each side is connected as a set of power wiring of delivery route chain for providing power to the delivery route motor, each magnetic element passes through a passing space between multiple sets of stacked longitudinal magnetic components so that the magnetic flux of the magnetic elements on each side is changed so as to produce an induced current as electromagnetic power on the winding coils to supply to the delivery route motor, and when the electromagnetic power generated by the magnetic elements is not sufficient to drive the delivery route chain, the power insufficiency is compensated with the power provided by the generator.

In another aspect of the present invention, the weights of the heavy objects, the length of the delivery route, and the height of the highest level may be adjusted to adjust the amount of power generated by the generator. The power of electromagnetism induced in the coil may be increased by shortening the distance between the magnetic elements and the heavy objects or increasing the magnetism of the magnetic elements and the heavy objects.

In another aspect of the present invention, the magnetic elements are magnetic cylinders, and the coils are connected in serial as a set of delivery route power wire. One set of delivery route power wire is provided on each side of each gravity route.

In another aspect of the present invention, each heavy object has a concave element used to engage with the bar element provided on the delivery route chain so as to be moved by the delivery route chain. Multiple convex elements are provided on the outer surface of each heavy object. Each heavy object falls in a gravity direction after the heavy object falls from the highest level to have the concave elements being separated from the delivery route chain by gravity.

In another aspect of the present invention, the adjacent heavy objects are allocated with equivalent space interval.

In another aspect of the present invention, the separation of the heavy object and the delivery route chain is done as the heavy object is fixedly against a wall and the delivery route moves continuously. Therefore, the concave element is separated from the bar element.

BRIEF DESCRIPTION OF THE DRAWINGS

FIG. 4(a) is an illustration showing the delivery route of the gravity power generating apparatus, in accordance with one embodiment of the present invention.

FIG. 4(b) is an illustration showing an upper partial diagram of the gravity power generating apparatus, in accordance with one embodiment of the present invention.

FIG. 4(c) is an illustration showing the relationship between the heavy objects and the magnetic cylinders, in accordance with the present invention.

FIG. 4(d) is a top view of the relative movement between the heavy object and the magnetic cylinders, in accordance with one embodiment of the present invention.

DETAILED DESCRIPTION

In the following, the preferred embodiments will be described according to the accompanying drawings. One person having ordinary skill in the art will easily understand that many modifications, changes, and equivalents may be made to the present invention without departing from the scope thereof. Many details are set forth for providing more specific understanding to the present invention. However, the present invention is not limited to the details described herein.

Figure 1:
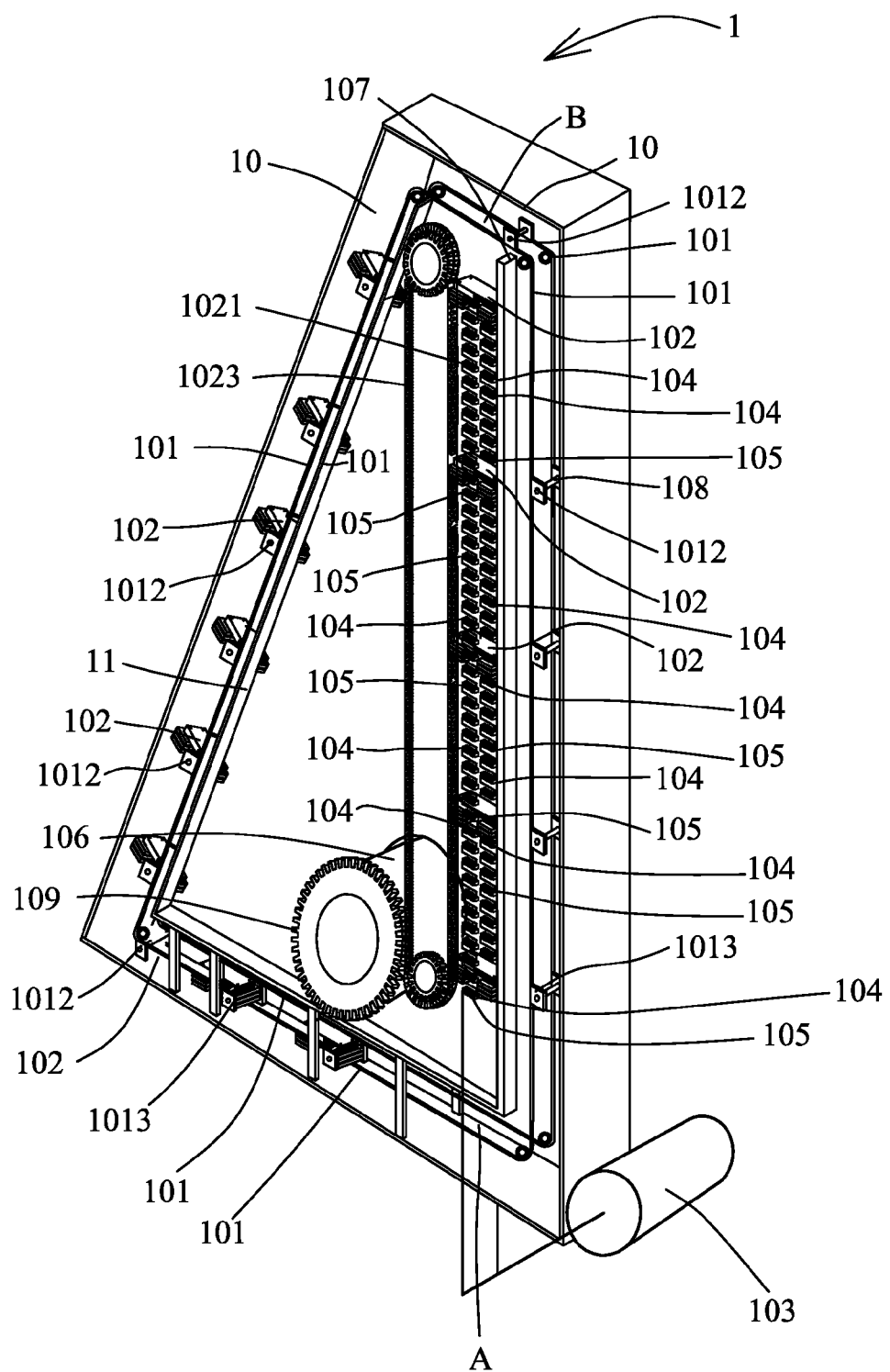
FIG. 1 is an illustration showing a side perspective view of the generator of the gravity power generating apparatus having one set of rotor, in accordance with one embodiment of the present invention.
Figure 2:
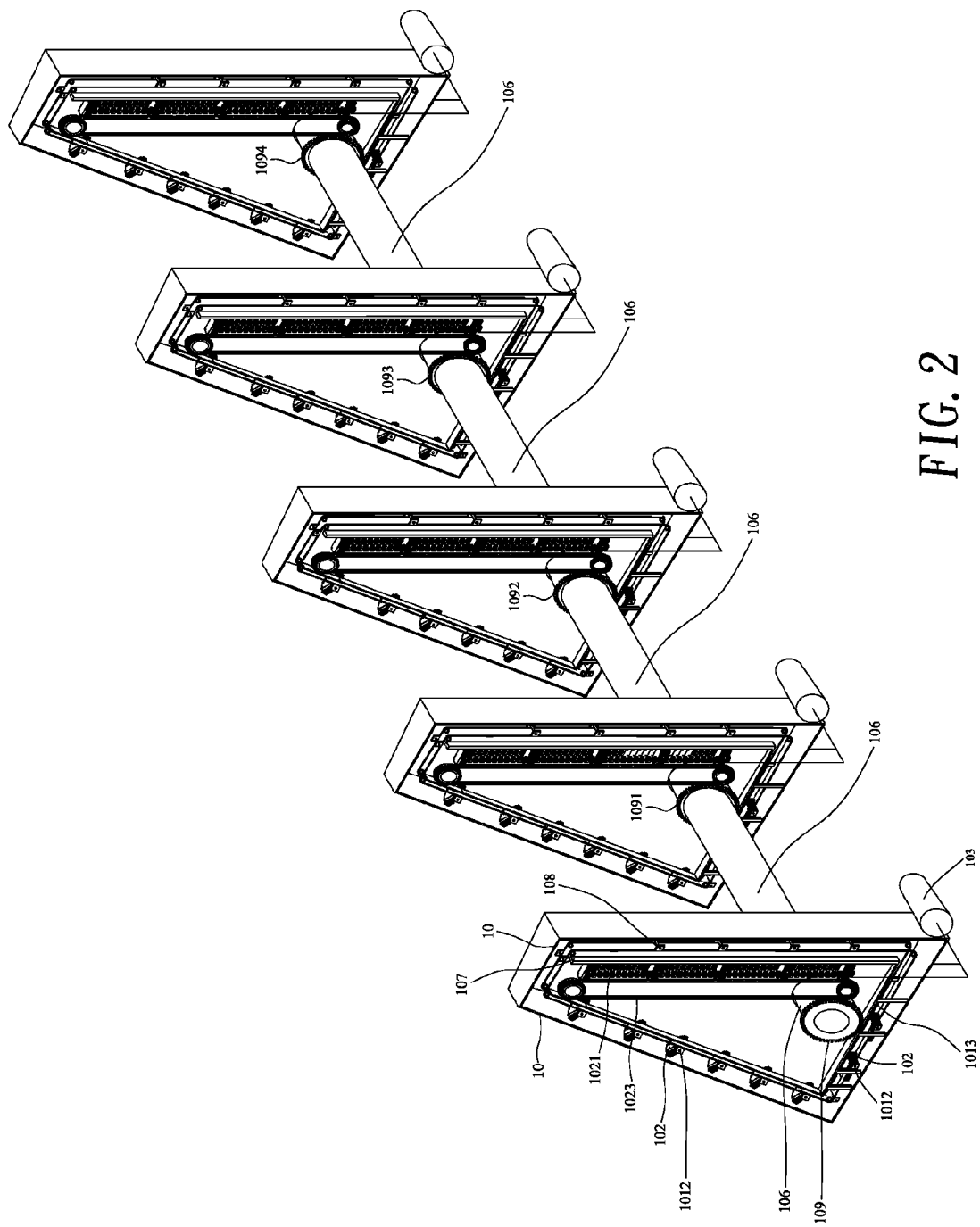
FIG. 2 is an illustration showing a side perspective view of the generator of the gravity power generating apparatus having five rotors, in accordance with one embodiment of the present invention.
Figure 3:
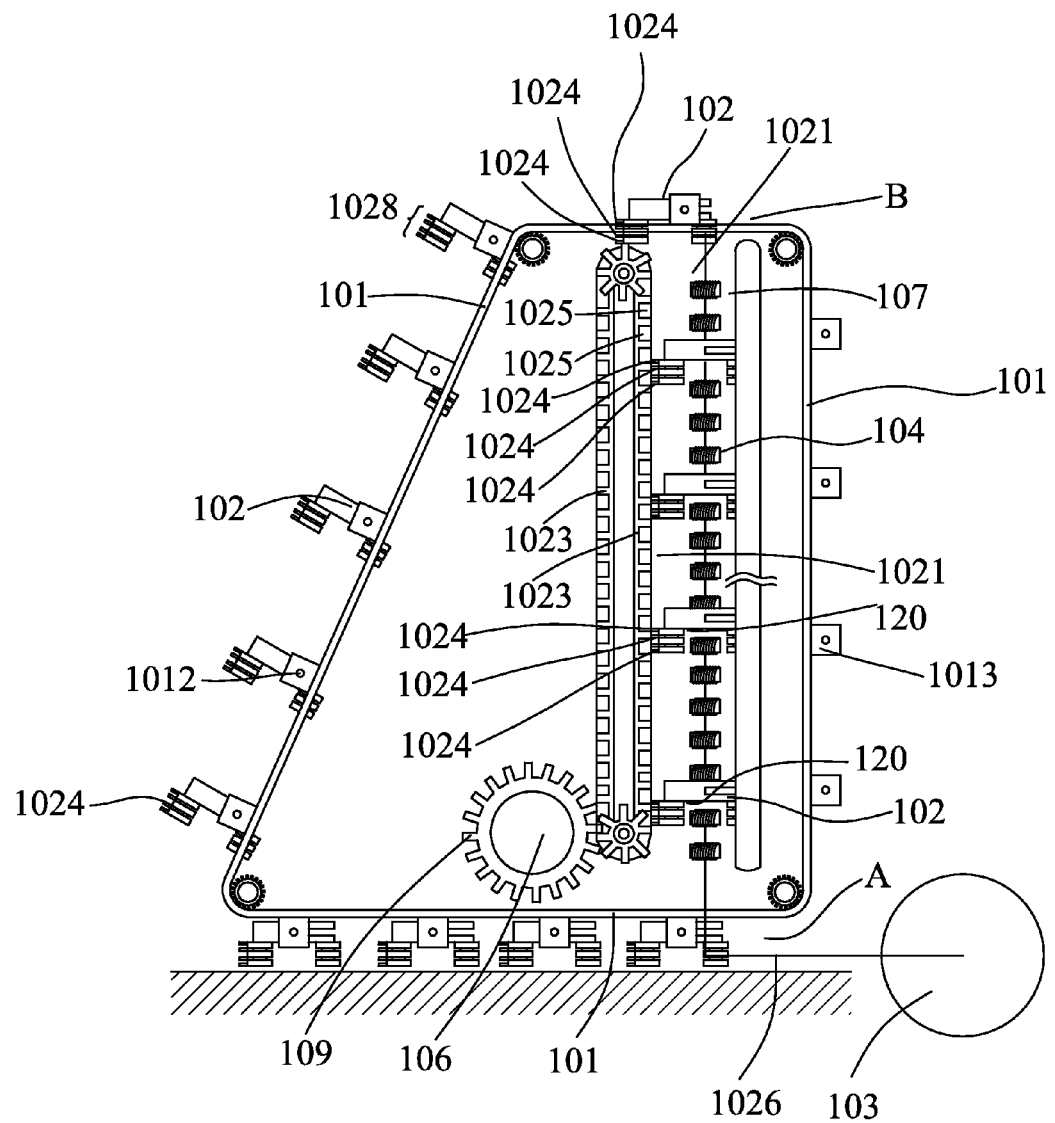
FIG. 3 is an illustration showing a side perspective view of the generator of the gravity power generating apparatus having one set of rotor, in accordance with the present invention.
Figure 5:
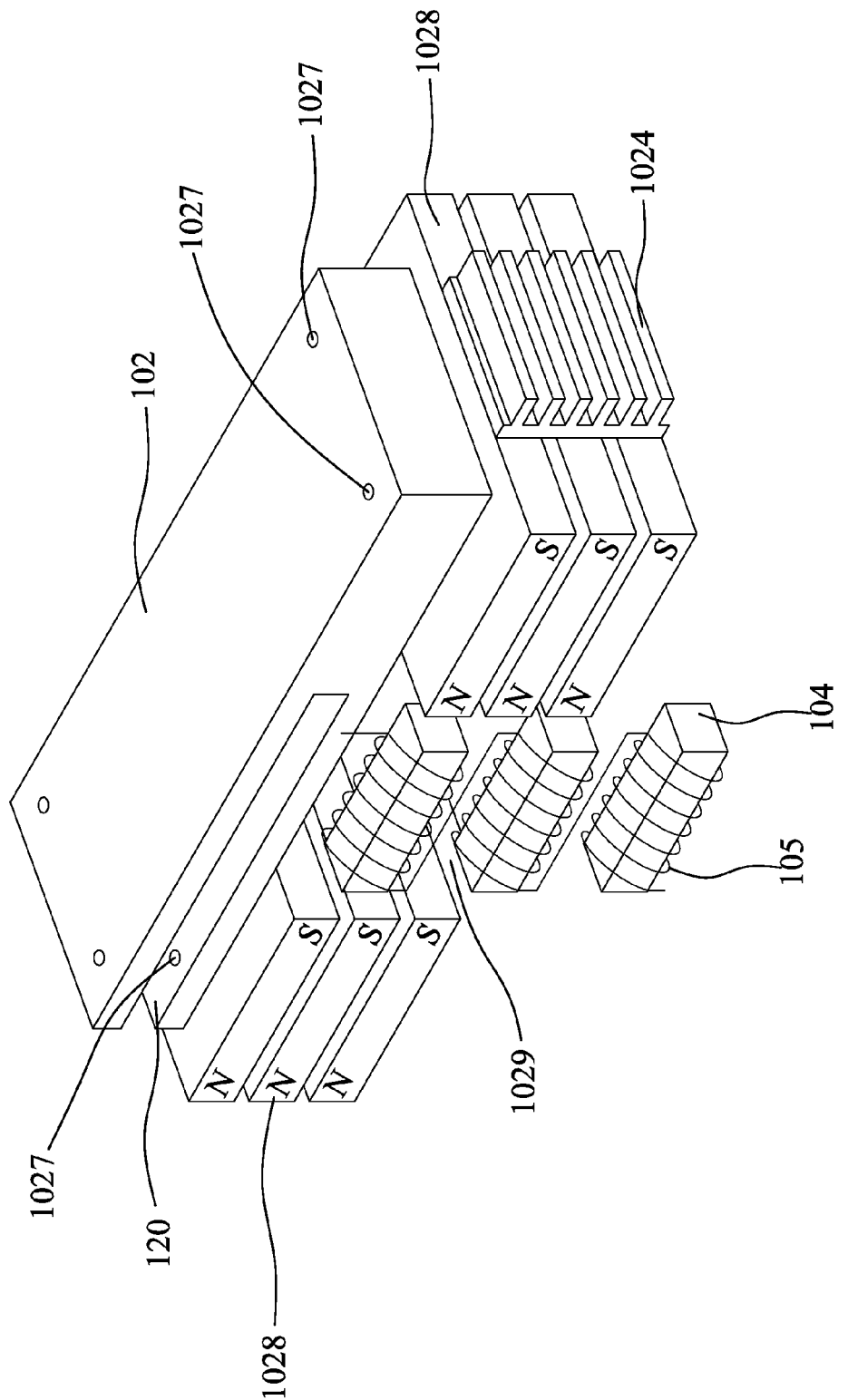
FIG. 5 is an illustration showing the configuration of the heavy object of the gravity power generating apparatus, in accordance with one embodiment of the present invention.
Figure 6:
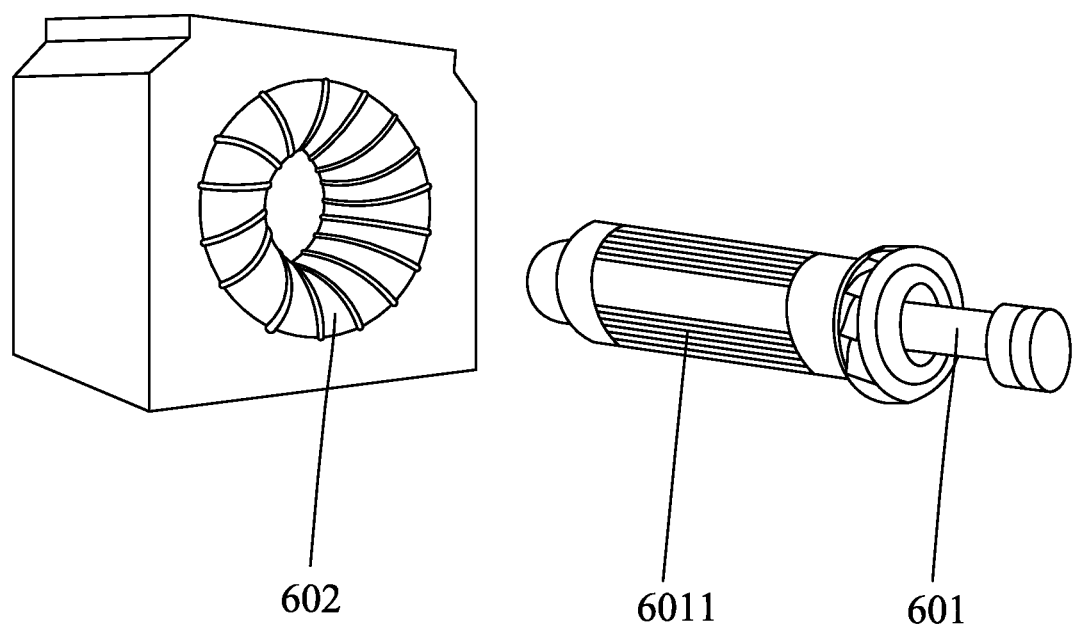
FIG. 6 is an illustration showing the conventional configuration of the generator used in a power generating plant.

Referring to FIG. 1, it shows an illustration of a side perspective view of gravity power generating apparatus 1, in accordance with one embodiment of the present invention. The gravity power generating apparatus 1 of the present invention is accommodated in a holding chamber 10 to prevent the gravity power generating apparatus from contamination and disturbance. FIG. 1 shows a side perspective view of removing one side of the holding chamber 10 for observing the internal elements of the gravity power generating apparatus 1. The gravity power generating apparatus 1 according to the present invention comprises a plurality of heavy objects 102, each heavy object 102 having a plurality sets of stacked longitudinal heavy component 1028, as shown in FIG. 5; a generator 106 for generating electrical power by rotating a rotor of the generator 106, wherein the rotor (not shown) of the generator 106 is inside the generator 106 and is rotated by having each heavy object 102 pass through a gravity route 1021 by gravity; a delivery route chain 101 for delivering each heavy object 102 from a lowest level spot A in the delivery route to a highest level spot B so as then to drive each heavy object 102 from the highest level spot B to move through the gravity route 1021 by gravity; a delivery route motor 103 for supplying power for the delivery route 101, wherein the delivery route motor 103 is initially started by an external power source (not shown); and a plurality of magnetic elements 104, which are magnetic cylinders (but also may be cuboids), provided around the gravity route 1021, wherein each magnetic cylinder 104 is wound around with a coil 105 on the surface for changing the magnetic flux of the magnetic elements 104 when the heavy object 102 passes through the gravity route 1021 so that the coil 105 of each magnetic element 104 influences the magnetic field to produce an electromagnetic induced current for the delivery route motor 103. At the beginning, the heavy objects 102 are in a still state at the lowest level spot A, during which there is not any induced power for the delivery route motor 103 to supply the movement of the delivery route chain 101. Therefore, the external power source is provided to the delivery route motor 103, so that the heavy objects 102 can be moved horizontally to reach the highest level starting spot (C) of the delivery route. The external power source, for starting the movement of the delivery route chain 101, can be regarded as a power source such as a wind power, a hydroelectric power or any other form of power source if it can be used for operating the delivery route motor 103. The heavy objects 102 then lean against a top surface of an inclined plate 11 after falling to the lowest level spot A and moving forward for a distance. The top surface thereof is smooth so that the friction during elevating the heavy objects 102 is reduced. Consequently, the force required for elevating the heavy objects 102 is reduced. A concave element 120 is provided in the upper side of each heavy object 102 (as shown in FIGS. 3 and 4) to engage to a bar element 108 (FIG. 4(a)) installed on the delivery route chain 101 such that each heavy object 102 is hooked to move forward or upward in the delivery route 101. A plurality of convex elements 1024 (FIG. 3 and FIG. 4(b)) are provided on the outer surface of the heavy object 102 to engage the gravity transmission chain 1023 of the gravity route 1021 when each heavy object 102 starts falling from the highest level spot B. Each heavy object 102 moves downward by gravity and engages the gravity transmission chain 1023 at the same time. Thus the gravity transmission chain 1023 is to move. One gravity transmission chain 1023 corresponds to driving gears 109 of one generator 106 (FIG. 1 and FIG. 2). The driving gears 109 of one generator 106 are driven by each gravity transmission chain 1023 to rotate the generator 106. During the operation of the gravity power generating apparatus, the delivery route motor 103 maintains the operation of the delivery route chain 101 by receiving the power from the external power source, and from either the magnetic elements 104 (induced current) or the generator 106. As the result, the power of the delivery route chain 101 required from the external power source is thus alleviated by the power supplied from the magnetic elements 104 and/or the generator 106.

Referring to FIG. 2, it shows an illustration of a side perspective view with five gravity power generating apparatuses of one embodiment of the present invention with the gravity power generating apparatus. The number of the set of heavy objects 102 is 14. Each heavy object 102 weighs 0.3 tons. The space between two adjacent heavy objects 102 in the same set is 1 meter. Each heavy objects 102 is transported through an individual gravity route 1021, an individual delivery route chain 101 and an individual gravity transmission chain 1023. One generator 106 may be operated by five heavy objects 102, each heavy objects being provided in parallel. Each heavy objects 102 and the adjacent heavy objects 102 may alternately rotate the rotor. The rotor is subjected to an even force to operate the generator 106. When the multiple heavy objects alternately rotate the rotor, it is impossible to produce any error. In other words, the multiple heavy objects 102 fall down orderly according to their positional order to continue rotating the rotor in the same direction.

Referring to FIG. 3, it is a side perspective view of the gravity power generating apparatus, in accordance with one embodiment of the present invention. The convex element 1024 provided on the outer surface of each heavy object 102 engages the concave hole 1025 of the gravity transmission chain 1023 when the heavy object 102 starts falling from the highest level spot B to the lowest level spot A. After fallen to the lowest level spot A, each heavy object 102 is hooked and move forward for a distance until it leans against the inclined plate 11 (not shown in FIG. 3). From the highest level spot B to the lowest level spot A, the heavy object 102 moves downward along the gravity route 1021 to drive the driving gears 109 of the generator 106. Referring to FIG. 5, the magnetic flux of the coil 105 wound around the magnetic cylinders 104, also referring to FIGS. 4(b), 4(c) and 4(d), is changed while each heavy object 102 moves downward by gravity to allow the magnetic cylinders 104 pass through the passing space 1029 between two sets of stacked heavy components 1028 of the heavy object 102. Thus a current is induced in the coil 105. The induced current is supplied to the delivery route motor 103 continuously as the magnetic cylinders 104 passing through the passing space 1029 consecutively, so that the load of the external power source for operating the delivery route motor 103 can be alleviated. When each heavy object 102 moves to the bottom of the gravity transmission chain 1023, the heavy object 102 separates from the gravity transmission chain 1023 and moves to the lowest level spot (A) on the delivery route. Then another cycle restarts with each heavy objects 102 being delivered from the lowest level spot (A) and slantwise upward to the highest level spot (B).

The operation of the gravity power generating apparatus 1 according to the embodiment will be described in detail by referring to FIGS. 4(a) to 4(d) as follows.

Referring to FIG. 4(a), the delivery route chain 101 consists of two parallel chains 1011. A bar element 108 is provided between the flange supporting members 1013 on the two chains 1011. The distal ends of the bar element 108 are fixed to the bearings 1012. The bar element 108 aligns to the concave element 120 of the heavy object 102 so that the bar element 108 engages with the heavy object 102. Thus the heavy object 102 is fixed to the delivery route chain 101 for delivery. The bar element 108 engages with the concave element 120 of the heavy object 102. The heavy object 102 is stationary while being delivered on the horizontal portion and the inclined plate 11 of the delivery route chain 101.

Referring to FIG. 4(b), it is an illustration showing an upper partial diagram of the gravity power generating apparatus 1, in accordance with one embodiment of the present invention. The heavy objects 102 continue to move horizontally after they reach the highest level starting spot (C) until the heavy objects 102 are blocked by a wall 107 and thus separate from the delivery route chain 101. The delivery route chain 101, the flange supporting members 1013 and the bar element 108 remain moving horizontally after the heavy object 102 is blocked by the wall 107. At the same time, the concave element 120 of the heavy object 102 separates from the bar element 108 and the heavy object 102 moves along the direction of gravity (i.e. move downward) by the engagement between the convex elements 1024 on the outer surface of the heavy object 102 and the gravity transmission chain 1023. This drives the driving gears 109 of the generator 106 to be rotating. The vertical space between the gravity transmission chain 1023 and the wall 107 is the gravity route 1021. The driving gears 109 of the generator 106 are rotated while the heavy objects 102 move downward along the gravity transmission chain 1023. In the embodiment, it is desirable that the adjacent heavy objects 102 are allocated with equivalent space interval and the generator 106 is operated under a constant velocity. The equivalent space interval maintains the same when each heavy object is carried in the gravity route 1021 and the delivery route chain 101.

Referring to FIG. 4(c) and FIG. 4(d), it describes how the induced current supplied to the delivery route motor 103 is produced by the relative movement between the plurality of heavy objects 102 and the magnetic cylinders 104 as below. The magnetic cylinders 104 are provided to allow passing through the passing space 1029 between two sets of stacked longitudinal heavy components 1028 of the heavy object 102. Here two sets of stacked longitudinal heavy components 1028 are provided, but more sets of stacked longitudinal heavy components may be provided and then corresponding magnetic cylinders 104 shall be provided. Each magnetic cylinder 104 is wound with a coil 105 on the surface as a winding coil. Each winding coil 105 on each side is connected into a set of power wiring 1026 of transmission route. The magnetic poles between the adjacent two stacked longitudinal magnetic components 1028 are different from each other. For example, in FIG. 4(c), on the left longitudinal side, each magnetic stacked longitudinal heavy component 1028 has an S pole on its right side. And on the right longitudinal side, each magnetic stacked longitudinal heavy component 1028 has an N pole on its left side. Therefore, when the magnetic cylinders 104 pass through the passing space 1029, the left end of the magnetic cylinders 104 has an induced N pole and the right end has an induced S pole. Thus a magnetic field is induced and magnetic flux of each magnetic cylinder 104 is changed. Consequently, an induced electromotive force is produced in the coils 105. The induced current may be obtained from dividing the magnitude of the induced electromotive force by the resistance of the coils 105. Also, the power wiring 1026 provided on both sides of the gravity route 1021 are connected to the delivery route motor 103 for supplying the induced current produced in the coils 105 to the delivery route motor 103, so that the load of the external power source for operating the delivery route motor 103 can be alleviated in this way.

The induced electromotive force produced in the coils 105 satisfies the following equation (1):

$$\varepsilon = -n \frac{d\varphi_B}{dt} \quad (1)$$

In which the negative sign indicates that the induced electromotive force is used to resist the change in the magnetic flux of the coils 105 ($d\varphi_B$), and n indicates the number of turns of the coils 105.

The change in magnetic flux satisfies the following equation (2):

$$\frac{d\varphi_B}{dt} = \frac{d}{dt} BA\cos\theta = A\cos\theta \frac{dB}{dt} + B\cos\theta \frac{dA}{dt} - AB\sin\theta \cdot \omega \quad (2)$$

In which B indicates the magnitude of the magnetic field between the different magnetic poles of the magnetic cylinders 104 and the heavy objects 102, A indicates the area of the coils 105, θ indicates the angle between the coils 105 and the magnetic field, and ω indicates the angular velocity of the coils 105. In the embodiment, the area surrounded by the coils remains unchanged and the coils 105 are not rotated (i.e. the angular velocity is zero). Thus the above equation may be rewritten as below:

$$\frac{d\varphi_B}{dt} = A\frac{dB}{dt} \quad (3)$$

Substituting the above equation (3) into the equation (1) of the induced electromotive force, the equation (1) may be computed as below:

$$\varepsilon_{in} = -nA\frac{dB}{dt}$$

The induced current in the coils 105 may be obtained from dividing the induced electromotive force by the resistance of the coils 105. The induced current may be supplied to the delivery route motor 103 through the power wiring 1026 to alleviate the load of the external power source for operating the delivery route motor 103. And the induced current, if any, may be transmitted to and stored in the generator 106. The induced electromotive force produced in the coils 105 may be increased by shortening the distance between the magnetic cylinders 104 and the heavy objects 102 or by increasing the magnetism between the magnetic cylinders 104 and the heavy objects 102.

Moreover, if the power from the external power source is insufficient to operate the delivery route motor 103, then the delivery route motor 103 can receive power from either the generator 106 or the magnetic elements 104 for delivering the heavy objects 102 along the delivery route.

In another embodiment of the present invention, as shown in FIG. 2, multiple heavy objects 102 may be provided in parallel. Each heavy objects 102 is transported by an individual gravity route 1021, an individual delivery route chain 101 and an individual gravity transmission chain 1023. The individual gravity route 1021 has an individual set of magnetic cylinders 104. The generator 106 has several sets of driving gears 109, 1091, 1092, 1093 and 1094. The several sets of driving gears 109, 1091, 1092, 1093 and 1094 may be moved by its corresponding gravity transmission chains 1023 so as to move the generator 106. Therefore the generator 106 is able to be operated under normal operating velocity.

In still another embodiment of the present invention, a plurality of generators 106 may be provided with corresponding heavy objects 102, delivery route chains 101, delivery route motors 103 and magnetic cylinders 104 for supplying more power. In the case of a plurality of generators 106 are provided, a micro switch connected to the generators 106; and one or two spare generators connected to the micro switch are provided. Normally, the spare generators don't work. After the micro switch is triggered due to the malfunction of the generators 106 (i.e. the generators 106 are stopped), the spare generators are activated immediately (in about 1 to 2 seconds). Thus power supplying is not interrupted.

Referring to FIG. 5, it is an illustration showing the corresponding relationship between the heavy object 102 and the magnetic cylinders 104 in accordance with one embodiment of the present invention. Each heavy object 102 having a concave element 120 and convex elements 1024 is configured with multiple-layers. The 3-layer configuration is an exemplary but not limiting configuration. The left end and the right end of each layer of the multiple-layers have an N pole and an S pole respectively. For example, in FIG. 5, the left end of each layer has an N pole and the right end of each layer has an S pole. That is, the left end of each layer may have an S pole and the right end of each layer may have an N pole. Furthermore, the distance between each magnetic cylinder 104 and each heavy object 102 is inverse proportional to the magnitude of the magnetism between each magnetic cylinder 104 and each heavy object 102. It is to say that from the above equation (1) of the induced electromotive force, the controlling of the distance between each magnetic cylinder 104 and each heavy object 102 may control the magnitude of the induced electromotive force produced in the coils 105. The density of the heavy objects 102 increases gradually from the top to the bottom so that the center of gravity of the heavy object 102 is in the bottom portion. By the above configuration, the heavy objects 102 become easier to keep standing without turning over when they move vertically from the gravity transmission chain 1023 to the delivery route chain 101 to be engaged with the bar element 108. For example, the configuration of the heavy object 102 is a heavy layer, a light layer and a concave layer provided with the concave element 120 from the bottom to the top. The place is called a falling point on which the heavy object 102 moves vertically from the gravity transmission chain 1023 to the delivery route chain 101. Further, the heavy layer and the light layer are magnetic and stacked as a magnetic stacked heavy object. The magnetic stacked heavy object and the concave element 120 are connected by a connector 1027 such as a rivet. The concave element 120 is not magnetic. The magnetic stacked heavy objects are symmetrical on two sides below the concave element 120. The layers are connected by non-magnetic material such as rubber. The two ends of each layer of the stacked magnetic heavy components 1028 have N and S poles respectively, as shown in FIG. 5. A passing space 1029 exists between the stacked heavy components that may allow the magnetic cylinders 104 to pass through. An induced current is generated in the coils 105 wounded on the magnetic cylinders 104. It can be seen from the embodiment that the magnetic cylinders 104 may be cuboids and the magnetic flux is induced in the two ends of the magnetic cylinders 104 as the magnetic cylinders 104 pass through the passing space 1029. The magnetic flux disappeared when the magnetic cylinders 104 leave the passing space 1029. The electromagnetic force is induced by the change of the magnetic flux. When viewing from the right side, the winding direction of the coils 105 is counterclockwise to the left end, by using the Ampere's right hand law, the direction of the magnetic field is from the left end to the right end, so the direction of the current is from the right end from the left end.

Also, in the gravity power generating apparatus 1 of the present invention, the weight of each heavy object 102, the length of the delivery route 101 and the height of the highest level spot B of the delivery route 101 may be adjusted to produce the variable amount of generated power of the generator 106. A plurality of generators 106 may be provided with corresponding sets of heavy objects 102, delivery routes chain 101, delivery route motors 103 and magnetic cylinders 104 wound with coils 105 to supply more power. Each heavy objects 102 provided in parallel has an individual delivery route 101 and gravity transmission chain 1023.

The electromagnetic induction energy produced from the relative movement provided to the delivery route motor to alleviate the load of the external power source for operating the delivery route motor 103 in a way that the electromagnetic induction energy can be used as supplementary power for compensating the power requirement of the delivery route motor 103. The generator 106 may supply energy to the delivery route motor 103 for compensating the power needed by the external power. The external power source, for starting the movement of the delivery route chain 101 and for maintaining the operation of the delivery route chain 101, can be regarded as a power source such as a wind power, a hydro-electric power or any other form of power source if it can be used for initializing the operation of delivery route motor 103.

The gravity power generating apparatus 1 according to the present invention is advantageous in its variety of energy source, easy maintenance and assembly, short maintaining time, and low cost. Also, the power generating apparatus according to the present invention neither relies on any special natural environment nor pollutes the natural environment at all. Thus the gravity power generating apparatus 1 achieves the effects of eternal protection of the natural environment and the development of all kinds of industry.

What is claimed is:

1. A gravity power generating apparatus comprising:
   a plurality of heavy objects, each heavy object being magnetized;
   a generator for generating electrical power by rotating a rotor of the generator, wherein the rotation of the generator is accomplished by having each heavy object of the set of heavy objects to pass through a gravity route by gravity;
   a delivery route chain for delivering each heavy object from a lowest level spot in the delivery route to a highest level spot in the delivery route to drive each heavy object to pass through the gravity route by gravity;
   a delivery route motor for supplying power for the delivery route chain, wherein the delivery route motor is initially started by an external power source; and
   a plurality of magnetic elements provided around the gravity route, wherein each magnetic element is wound around with a coil on the surface so that the magnetic flux of the magnetic elements is changed when each heavy object passes through the gravity route to induce an electrical current as power of electromagnetism, in the coil, to supply to the delivery route motor,
   wherein the gravity route is provided with a gravity transmission chain being engaging with each heavy object to move downward so as to pull the gravity transmission chain downward to rotate the rotor of the generator,
   wherein the delivery route motor maintains the operation of the delivery route chain by receiving the power from the external power source, and from either the magnetic elements or the generator, and
   wherein the power of the delivery route chain required from the external power source is alleviated by the power supplied from the magnetic elements and/or the generator.

2. The gravity power generating apparatus as claim 1, wherein
   the generator engages with the gravity transmission chain through a set of driving gears to rotate the rotor.

3. The gravity power generating apparatus as claim 1, wherein
   the plurality of magnetic elements are provided on both sides of the gravity route, a surface on each magnetic element is wound with a coil as a winding coil, each winding coils on each side is connected as a set of power wiring of delivery route for providing power to the delivery route motor,
   each magnetic element passes through a passing space between multiple sets of stacked longitudinal magnetic components so that the magnetic flux of the magnetic elements on each side is changed so as to produce an induced current as electromagnetic power on the winding coils to supply to the delivery route motor, and
   when the electromagnetic power generated by the magnetic elements is not sufficient to drive the delivery route, the power insufficiency is compensated with the power generated by the generator.

4. The gravity power generating apparatus as claim 1, wherein
   the amount of power generated by the generator is adjusted by adjusting the weight of heavy objects, the length of the delivery route and the height of the highest level, and the power of electromagnetism induced in the coil is increased by shortening the distance between the magnetic elements and the heavy objects or by increasing the magnetism of the magnetic elements and of the heavy objects.

5. The gravity power generating apparatus of claim 2, wherein
   the magnetic elements are magnetic cylinders, and the coils are connected in serial as a set of delivery power wire, and
   one set of delivery power wire is provided on each side of one gravity route.

6. The gravity power generating apparatus as claim 2, wherein the plurality of magnetic elements are provided on both sides of the gravity route, a surface on each magnetic element is wound with a coil as a winding coil, each winding coils on each side is connected as a set of power wiring of delivery route for providing power to the delivery route motor, each magnetic element passes through a passing space between multiple sets of stacked longitudinal magnetic components so that the magnetic flux of the magnetic elements on each side is changed so as to produce an induced current as electromagnetic power on the winding coils to supply to the delivery route motor, and when the electromagnetic power generated by the magnetic elements is not sufficient to drive the delivery route, the power insufficiency is compensated with the power generated by the generator.

7. The gravity power generating apparatus as claim 2, wherein the amount of power generated by the generator is adjusted by adjusting the weight of heavy objects, the length of the delivery route and the height of the highest level, and the power of electromagnetism induced in the coil is increased by shortening the distance between the magnetic elements and the heavy objects or by increasing the magnetism of the magnetic elements and of the heavy objects.

8. The gravity power generating apparatus as claim 2, wherein each heavy object has a concave element for being engaged with a bar element provided on the delivery route chain when a heavy object is carried by the delivery route chain, and multiple convex elements are provided on the outer surface of each heavy object for being engaged with the gravity transmission route to rotate the rotor of the generator because of each heavy object falling in a gravity direction after the heavy object falls from the highest level to have the concave elements being separated from the delivery route chain by gravity.

9. The gravity power generating apparatus as claim 8, wherein the separation of the heavy object and the delivery route chain is achieved by a wall element that blocks the heavy object after the heavy object reaches the highest level and keeps moving in a horizontal direction to detach the concave element from the bar element.

10. The gravity power generating apparatus as claim 2, wherein the adjacent heavy objects are allocated with equivalent space interval.

11. The gravity power generating apparatus as claim 1, wherein each heavy object has a concave element for being engaged with a bar element provided on the delivery route chain when a heavy object is carried by the delivery route chain, and multiple convex elements are provided on the outer surface of each heavy object for being engaged with the gravity transmission route to rotate the rotor of the generator because of each heavy object falling in a gravity direction after the heavy object falls from the highest level to have the concave elements being separated from the delivery route chain by gravity.

12. The gravity power generating apparatus as claim 11, wherein the separation of the heavy object and the delivery route chain is achieved by a wall element that blocks the heavy object after the heavy object reaches the highest level and keeps moving in a horizontal direction to detach the concave element from the bar element.

13. The gravity power generating apparatus of claim 1, wherein the magnetic elements are magnetic cylinders, and the coils are connected in serial as a set of delivery power wire, and one set of delivery power wire is provided on each side of one gravity route.

14. The gravity power generating apparatus as claim 1, wherein the adjacent heavy objects are allocated with equivalent space interval.

* * * * *